(12) United States Patent
Hsu

(10) Patent No.: US 8,035,737 B2
(45) Date of Patent: Oct. 11, 2011

(54) FOLDABLE PICTURE-TAKING DEVICE WITH SCANNING FUNCTION

(75) Inventor: Chun Chieh Hsu, Hsichih (TW)

(73) Assignee: CRS Electronic Co., Ltd., Taipei Hsien (TW)

( * ) Notice: Subject to any disclaimer, the term of this patent is extended or adjusted under 35 U.S.C. 154(b) by 416 days.

(21) Appl. No.: 12/292,773

(22) Filed: Nov. 26, 2008

(65) Prior Publication Data

US 2010/0128167 A1    May 27, 2010

(51) Int. Cl.
*H04N 5/225* (2006.01)
(52) U.S. Cl. .......................... 348/376; 348/373; 348/375
(58) Field of Classification Search .................. 348/373, 348/375–376
See application file for complete search history.

(56) References Cited

U.S. PATENT DOCUMENTS

| | | | | |
|---|---|---|---|---|
| 6,811,129 B2* | 11/2004 | Kimura | ................ | 248/221.11 |
| 2003/0095200 A1* | 5/2003 | Nagano | ................ | 348/373 |
| 2004/0201776 A1* | 10/2004 | Teong et al. | ................ | 348/375 |
| 2005/0040298 A1* | 2/2005 | Ohki et al. | ................ | 248/176.1 |
| 2005/0088527 A1* | 4/2005 | Silverbrook | ................ | 348/207.2 |
| 2005/0250532 A1* | 11/2005 | Hwang et al. | ................ | 455/550.1 |
| 2006/0196706 A1* | 9/2006 | Tellenbach et al. | ................ | 177/229 |
| 2008/0151099 A1* | 6/2008 | Lin et al. | ................ | 348/376 |

\* cited by examiner

*Primary Examiner* — Timothy J Henn
*Assistant Examiner* — Pritham Prabhakher
(74) *Attorney, Agent, or Firm* — Leong C. Lei

(57) ABSTRACT

The present invention relates to a foldable picture-taking device with scanning function including a picture-taking main body, a connecting module, and a supporting base module, wherein one end of the picture-taking main body is linked with a first revolving device and the supporting base module is linked with a second revolving device. The whole body can provide a support while taking the pictures and a convenient angle adjustment. While not being used it can be folded and carried conveniently and let the lens have a very good protection. The present invention is further cooperated with a scanning-system-software to have scanning and picture-taking functions through the connection between signal connecting interface in the picture-taking device and computer.

2 Claims, 4 Drawing Sheets

FOLDABLE PICTURE-TAKING DEVICE WITH SCANNING FUNCTION

BACKGROUND OF THE INVENTION

Currently, there are many picture-taking devices that can connect with the computer and particularly the network picture-taking devices. The clamps or other simple fixing devices are used to fix them while using and thus can take pictures for the objects. However, this kind of picture-taking device needs to have a lens cover to protect them while being carried. And, this kind of picture-taking device is often smaller in volume and with a very small lens cover, thus it is easily lost. Furthermore, there is another problem that the picture-taking device needs to adjust its angle continuously while taking the pictures to get better picture-taking effects after many attempts.

SUMMARY OF THE INVETNION

In order to solve the aforementioned insufficiency existing in the present technologies and let the picture-taking device be more conveniently while being carried and at the same time be more conveniently while being used, the present invention provides a foldable picture-taking device with scanning function, which includes a picture-taking main body, a connecting module, and a supporting base module, wherein one end of the picture-taking main body is linked with a first revolving device and the supporting base module is linked with a second revolving device. Through this combination, while there are needs to take the pictures of scenery, characters or real objects, the supporting base module can be laid horizontally and the connecting module can stand erectly, the angle of picture-taking main body is adjusted and at the same time a lens turning key is turned to picture-taking location. While there are requirements to scan files, photos, name cards, or pictures, the supporting base module and the connecting module can all be laid horizontally, the picture-taking main body stands erectly, the files, photos, name cards, or pictures to be scanned are clamped in the concaved grooves of supporting base module, the lens turning key is turned to scanning location and the scanning under picture-taking mode is then proceeded. That is, the present invention can not only proceed the picture-taking but also can proceed the file scanning and name card scanning; can provide a support while picture taking and conveniently adjust the angle, and the main body can also be folded to be able to be carried conveniently and the lens can have a very good protection while not being used.

The characteristics and effects of the present invention are described hereinafter by cooperating with the drawings.

DETAILED DESCRIPTION OF THE PREFERRED EMBODIMENT

Figure 1:
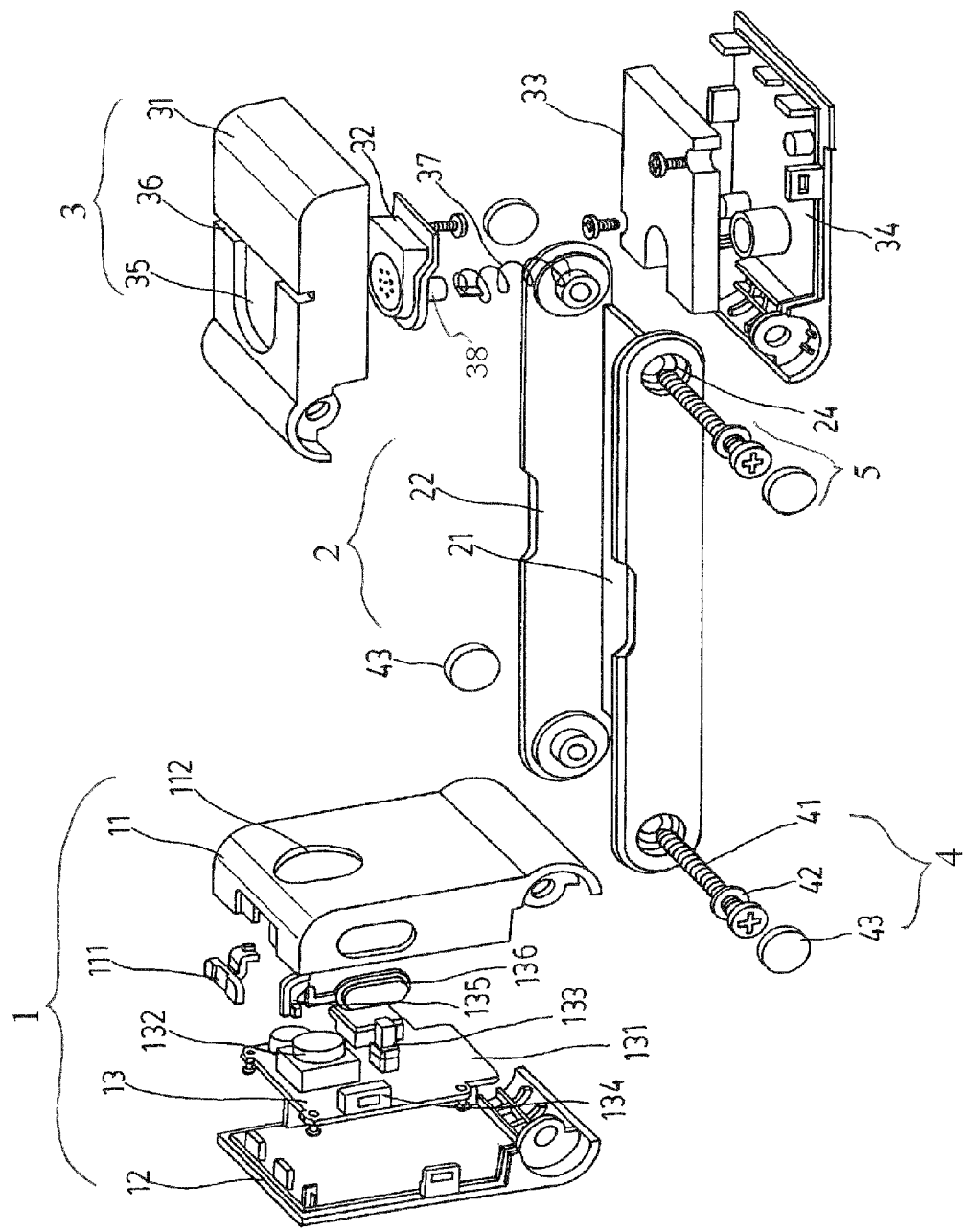
FIG. 1 is an analytic structural diagram of the present invention.

Please refer firstly to FIG. 1. The present invention is a foldable picture-taking device with scanner function including a picture-taking main body 1, a connecting module 2, and a supporting base module 3, wherein the picture-taking main body 1 is passing through a first revolving device 4 to connect with the connecting module 2 and the supporting base module 3 is passing through a second revolving device 5 to connect with the connecting module 2.

The picture-taking main body 1 is including a front cover 11, a rear cover 12, and a lens device 13 located in between the front cover 11 and rear cover 13.

The front cover 11 has a lens turning key 111, a lens hole 112, and a signal connection interface 113 mounted on it. The lens device 13 is connected with the front cover 11 through a screw. The lens device 13 is including a circuit board 131 and a lens 132 is fixed on the circuit board 131 and passing through the lens hole 112 of front cover 11. The lens device 13 is including further an LED device. The LED device is including an LED lamp 133, an LED lamp switch 134, a light guide 135, and an LED lamp-switching button 136. The LED lamp 133 and LED lamp switch 134 are fixed on the circuit board 131. The LED lamp-switching button 136 and the light guide 135 are passing through the front cover 11. While the light beam during the picture-taking or scanning are worse, the LED lamp-switching button 136 can be pressed to power on the LED lamp 133 to supply the light source.

The supporting base module 3 is including a base front cover 31, a base clamp 32, a base clamp counter weight 33, and a base rear cover 34, wherein the base front cover 31 has an opening 35 receiving the base clamp 32. This opening 35 is connected with a concaved groove 36. One side of the base clamp 32 is screw-connected together with the base front cover 31 such that the concaved groove 36 can clamp-hold effectively the object required to be scanned. Through an elastic element 37, the other side is passing through the base clamp counter weight 33 and connected with the base rear cover 34. The base clamp counter weight 33 is screw-connected with the base rear cover 34.

The connecting module 2 is a box-cover shaped device including a base plate 21 and two side strips 22. A space formed by the base plate 21 and two side strips 22 can just accommodate the picture-taking main body 11 and the supporting base module. Ends of every side strip have all corresponding openings 24.

The first revolving device 4 is including a connecting body 41, a spring washer 42, and a hole-plug 43. The connecting body 41 can be a screw. The hole-plug 43 can be an aluminum plate. The second revolving device 5 has the same structure as that of the first revolving device 4. After the connecting body 41 passes through the spring washer 42, it passes the side 22 of the connecting module 2 then passes through the picture-taking main body 1 or supporting base module 3 to be connected together with the connecting module 2. The spring washer 42 can have the connecting body 41 not able to escape from the hole 24. The hole-plug 43 can seal off the hole 24 in the side 22 of connecting module 2 and at the same time keep the side 22 of connecting module 2 be flat and smooth.

The picture-taking device of present invention is further cooperated with a scanning-system-software to have scanning and picture-taking functions through the connection between signal connecting interface 113 in the picture-taking device and computer.

Figure 2:
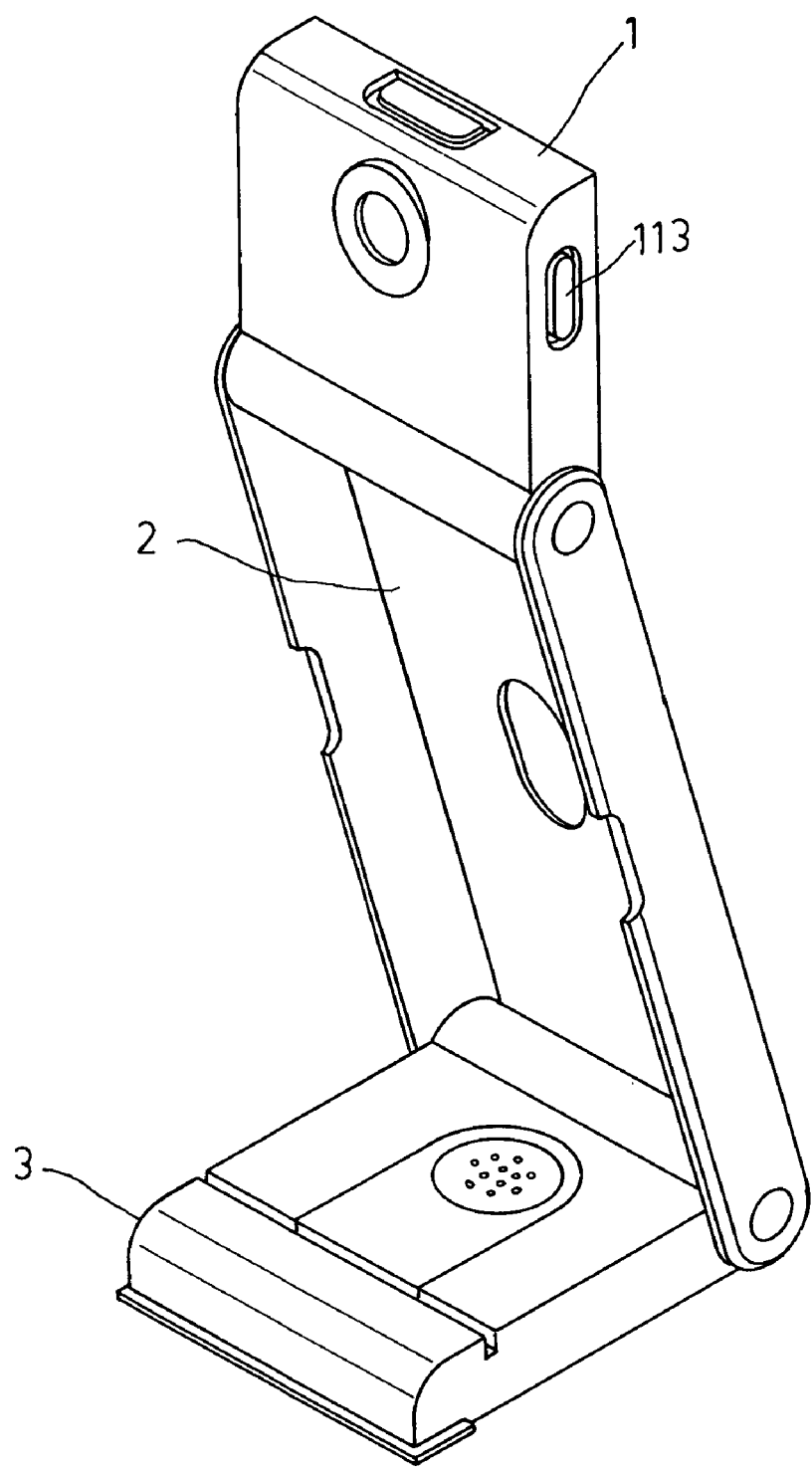
FIG. 2 is a using status diagram of the present invention while using picture-taking function.

While taking the pictures of scenery, characters or real objects, hands are used to hold the connecting-module 2, the angle of picture-taking main body 1 is adjusted and a lens turning key 111 is pressed then the pictures are taken. The data information obtained is transferred to the computer through the signal-connecting interface 113. The base's rear cover 34 of supporting base module 3 can also be laid horizontally on the plain surface such as on the table and let the connecting module 2 stand erectly, the angle of picture-taking main body 1 and connecting module 2 are adjusted then the picture-taking is proceeded as shown in FIG. 2.

Figure 3:
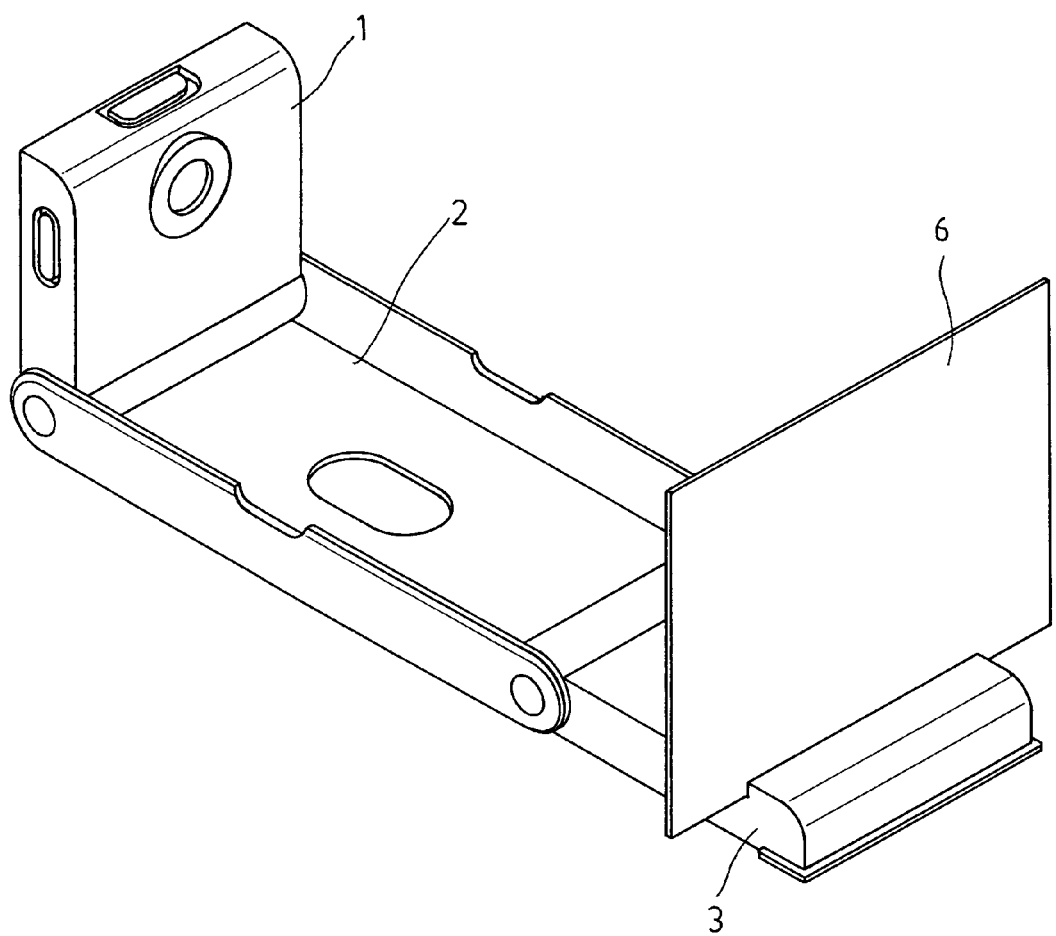
FIG. 3 is a using status diagram of the present invention while using scanning function.

While proceeding the scanning of files, name cards, or pictures, the connecting module 2 and the base's rear cover 34 of supporting base module 3 can all be laid horizontally, let something such as name card 6 be clamped in the concaved grooves 36 of supporting base module 3 and at the same time let the picture-taking main body 1 be adjusted to a position perpendicular to the connecting muddle 2, then the picture-taking is proceeded as shown in FIG. 3.

Figure 4:
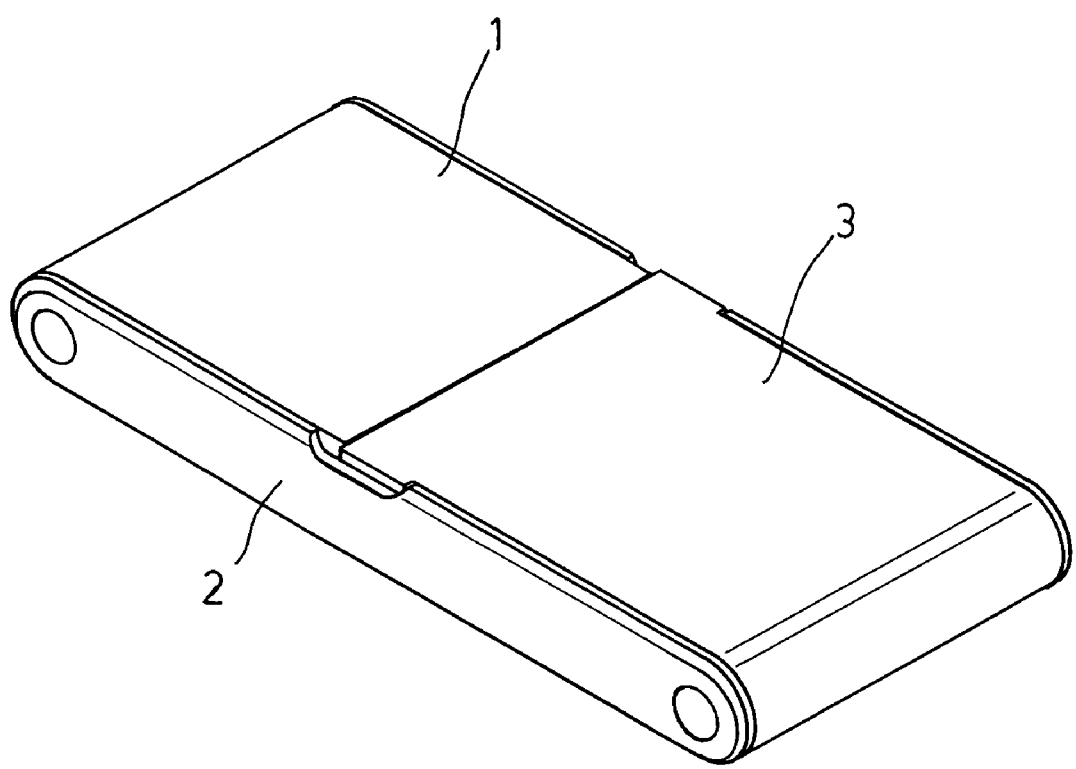
FIG. 4 is a not-used status diagram of the present invention while receiving.

Furthermore, due to that the picture-taking main body 1 and the supporting base module 3 can all be revolved on the connecting module 2, the picture-taking main body 1 and the supporting base module 3 can all be folded and laid on the base plate 21 of connecting module 2 while not been used such that the picture-taking lens can have a very good protection and a convenient body carrying can be provided as shown in FIG. 4.

I claim:

1. A foldable picture-taking device with scanning function comprising:

a main body having a front cover, a rear cover and a lens device, said front cover being provided with a lens turning key, a lens hole and a signal connection interface, said lens device being connected with said front cover through a screw, said lens device having a circuit board and an LED device, said circuit board being provided with a lens passing through a lens hole of said front cover, said LED device having an LED lamp, an LED lamp switch, a light guide and an LED lamp-switching button, said LED lamp and said LED lamp switch being fixed on said circuit board, said lens switching button and said light guide passing through said front cover, said LED lamp switching button being used for powering on said LED lamp to supply light source as required;

a connecting module having a base plate and two side strips thereby forming a space and having a first end provided with a first revolving device and a second end provided with a second revolving device, said main body being received in said space and rotatably connected with said first revolving device; and a supporting base module having a base front cover, a base clamp, a base clamp counter weight, and a base rear cover, said base front cover having an opening receiving said base clamp and a concaved groove connected with said opening, one side of said base clamp being screw-connected with said base front cover thereby enabling said concaved groove to hold a sheet object to be scanned, an opposite side of said base clamp having a projection on which is sleeved an elastic element, said projection extending through said base clamp counter weight to connect with said base rear cover, said base clamp counter weight being screw-connected with said base rear cover, said supporting base module being received in said space of said connecting module and rotatably connected with said second revolving device of said connecting module.

2. The foldable picture-taking device with scanning function as claimed in claim 1, wherein each of said first and second revolving devices comprises a connecting body, a spring washer and a hole-plug.

* * * * *